United States Patent
Nishikawa

(10) Patent No.: US 11,490,028 B2
(45) Date of Patent: Nov. 1, 2022

(54) TWO-DIMENSIONAL FLICKER MEASUREMENT APPARATUS AND TWO-DIMENSIONAL FLICKER MEASUREMENT METHOD

(71) Applicant: Konica Minolta, Inc., Tokyo (JP)

(72) Inventor: Yoshihiro Nishikawa, Kobe (JP)

(73) Assignee: Konica Minolta, Inc., Tokyo (JP)

( * ) Notice: Subject to any disclaimer, the term of this patent is extended or adjusted under 35 U.S.C. 154(b) by 333 days.

(21) Appl. No.: 16/641,877

(22) PCT Filed: Sep. 10, 2018

(86) PCT No.: PCT/JP2018/033492
§ 371 (c)(1),
(2) Date: Feb. 25, 2020

(87) PCT Pub. No.: WO2019/069633
PCT Pub. Date: Apr. 11, 2019

(65) Prior Publication Data
US 2020/0252536 A1    Aug. 6, 2020

(30) Foreign Application Priority Data
Oct. 5, 2017    (JP) .............................. JP2017-195103

(51) Int. Cl.
*H04N 5/235*    (2006.01)
*G01J 1/44*    (2006.01)
*G01M 11/00*    (2006.01)

(52) U.S. Cl.
CPC .............. *H04N 5/2357* (2013.01); *G01J 1/44* (2013.01); *G01M 11/00* (2013.01)

(58) Field of Classification Search
CPC ........ H04N 5/2357; G01J 1/44; G01M 11/00; G09G 3/006; G02F 1/13
See application file for complete search history.

(56) References Cited

U.S. PATENT DOCUMENTS

2017/0366731 A1* 12/2017 Onodera .............. H04N 5/2357

FOREIGN PATENT DOCUMENTS

JP    2006-91149 A    4/2006
JP    2008-304305 A    12/2008
(Continued)

OTHER PUBLICATIONS

International Search Report (ISR) dated Nov. 27, 2018 filed in PCT/JP2018/033492 and its English translation.
(Continued)

*Primary Examiner* — Twyler L Haskins
*Assistant Examiner* — Angel L Garces-Rivera
(74) *Attorney, Agent, or Firm* — Rankin, Hill & Clark LLP

(57) ABSTRACT

A two-dimensional flicker measurement apparatus includes: a first calculation unit that calculates a flicker amount of each of a plurality of measurement regions set on a measurement target based on a photometric quantity obtained by performing photometry in the measurement target at a first sampling frequency; a second calculation unit that calculates a flicker amount of a predetermined measurement region set on the measurement target based on a photometric quantity obtained by performing photometry in the predetermined measurement region at a second sampling frequency; and a correction unit that corrects the flicker amount of each of the plurality of measurement regions calculated by the first calculation unit using a correction coefficient defined by the flicker amount calculated by the second calculation unit and a flicker amount of the predetermined measurement region calculated based on a photometric quantity obtained by performing photometry in the predetermined measurement region at the first sampling frequency.

20 Claims, 9 Drawing Sheets

(56) References Cited

FOREIGN PATENT DOCUMENTS

| | | |
|---|---|---|
| JP | 2011-169842 A | 9/2011 |
| JP | 2012-120132 A | 6/2012 |
| WO | 2017/038675 A1 | 3/2017 |

OTHER PUBLICATIONS

PCT Written Opinion of the International Searching Authority dated Nov. 27, 2018 issued in PCT/JP2018/033492 and its English translation.
Japanese Office Action (JPOA) dated Feb. 1, 2022 for Corresponding Japanese Patent Application No. 2019-546595 and its English translation.
Chinese Office Action (CNOA) dated May 17, 2021 issued in the corresponding Chinese Patent Application No. 201880063575.4 and its English Translation.
Japanese Office Action (JPOA) dated Jul. 19, 2022 for Japanese Patent Application No. 2019-546595; English translation.

\* cited by examiner

TWO-DIMENSIONAL FLICKER MEASUREMENT APPARATUS AND TWO-DIMENSIONAL FLICKER MEASUREMENT METHOD

TECHNICAL FIELD

The present invention relates to a technique for measuring the flicker amount of a display screen, for example.

BACKGROUND ART

Conventionally, the flicker amount of a display screen has been evaluated based on the flicker amount measured for one measurement region (measurement point) set within the display screen. However, in recent years, display screens have become larger. In the case of a large display screen, the flicker amount of the display screen cannot be evaluated only by the flicker amount of one measurement region, and it is necessary to set a plurality of measurement regions. Therefore, a technique for measuring the flicker amount for each of a plurality of measurement regions set within the display screen has been proposed.

As such a technique, for example, Patent Literature 1 discloses a flicker measurement method for measuring flicker of an image displayed on a display device. In the flicker measurement method, an image capturing control step of acquiring an imaging signal generated by sequentially capturing the image at time intervals longer than the period of flicker to be measured by a predetermined additional time with an imaging apparatus and a flicker waveform calculation step of calculating the waveform of the flicker using the intensity of light in the imaging signal acquired in the image capturing control step as data for each additional time are executed. In the flicker waveform calculation step, the waveform of the flicker is calculated for each of divided regions obtained by dividing the image in the imaging signal into a plurality of regions.

When the flicker amount is measured using a low sampling frequency (for example, 128 Hz), as will be described later, the measured flicker amount is smaller than the true value of the flicker amount. If the sampling frequency used for measuring the flicker amount is increased (for example, 512 Hz), this can be prevented. However, in the case of measuring the flicker amount of each of a plurality of measurement regions using a high sampling frequency, the following problem occurs.

The flicker amount of each of the plurality of measurement regions is measured using a two-dimensional imaging device. As the two-dimensional imaging device, there are a charge coupled device (CCD) sensor and a complementary MOS (CMOS) sensor. In any case, the output signal is large if the amount of accumulated charge is large, and the output signal is small if the amount of accumulated charge is small. As the sampling frequency increases, the charge accumulation time is shortened, so that the output signal is reduced. Therefore, the S/N ratio of the output signal is reduced.

The amount of data in the measurement of the flicker amount of each of the plurality of measurement regions is larger than that in the measurement of the flicker amount of one measurement region. In addition, the amount of data when the sampling frequency is high is larger than that when the sampling frequency is low. Therefore, in the case of measuring the flicker amount of each of the plurality of measurement regions using a high sampling frequency, the CPU should process data at high speed. For this reason, a high-performance CPU is required.

The high sampling frequency herein is, for example, 512 Hz. This value is considerably larger than the frame rate (for example, 60 fps (=60 Hz), 128 fps (=128 Hz)) of a normal two-dimensional imaging device. The normal two-dimensional imaging device cannot support a high sampling frequency.

CITATION LIST

Patent Literature

Patent Literature 1: JP 2011-169842 A

SUMMARY OF INVENTION

It is an object of the present invention to provide a two-dimensional flicker measurement apparatus and a two-dimensional flicker measurement method capable of measuring the flicker amount of each of a plurality of measurement regions set on a measurement target with high accuracy using a low sampling frequency.

In order to achieve the aforementioned object, a two-dimensional flicker measurement apparatus according to an aspect of the present invention includes a photometric unit, a first calculation unit, a second calculation unit, and a correction unit. The photometric unit has a first function of performing photometry in a two-dimensional region at a first sampling frequency and a second function of performing photometry in a region smaller than the two-dimensional region at a second sampling frequency higher than the first sampling frequency. The first calculation unit calculates a flicker amount of each of a plurality of measurement regions set on a measurement target based on a photometric quantity of the measurement target obtained by performing photometry in the measurement target at the first sampling frequency by the photometric unit. The second calculation unit calculates a flicker amount of a predetermined measurement region set on the measurement target based on a photometric quantity of the predetermined measurement region obtained by performing photometry in the predetermined measurement region at the second sampling frequency by the photometric unit. The correction unit corrects the flicker amount of each of the plurality of measurement regions calculated by the first calculation unit using a correction coefficient defined by the flicker amount calculated by the second calculation unit and a flicker amount of the predetermined measurement region calculated based on a photometric quantity of the predetermined measurement region obtained by performing photometry in the predetermined measurement region at the first sampling frequency by the photometric unit.

The advantages and features provided by one or more embodiments of the invention will be fully understood from the detailed description given below and the accompanying diagrams. The detailed description and the accompanying diagrams are provided by way of example only and are not intended as limiting definitions of the present invention.

DESCRIPTION OF EMBODIMENTS

Figure 1:
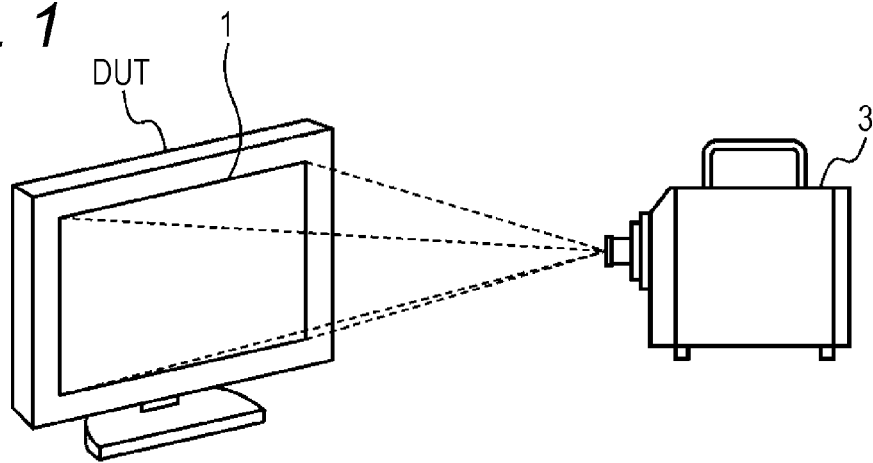
FIG. 1 is a diagram illustrating a relationship between a color display (DUT) having a screen as a measurement target and a two-dimensional flicker measurement apparatus.

Hereinafter, one or more embodiments of the present invention will be described with reference to the diagrams. However, the scope of the invention is not limited to the disclosed embodiments.

In the diagrams, components denoted by the same reference numerals indicate the same components, and descriptions of the components that have already been described will be omitted. In this specification, in the case of generically referring to a component, the component is denoted by reference numeral with a suffix omitted (for example, a two-dimensional flicker measurement apparatus 3). In the case of referring to individual components, the components are denoted by reference numerals with suffixes (for example, two-dimensional flicker measurement apparatuses 3-1 and 3-2).

FIG. 1 is a diagram illustrating a relationship between a color display (DUT=Device Under Test) having a screen 1 as a measurement target and the two-dimensional flicker measurement apparatus 3. The measurement target has a function of displaying an image. In the embodiment, an explanation will be given with the screen 1 of the DUT (hereinafter, a DUT screen 1) as an example. The measurement target is not limited to the display screen, but may be, for example, a projection type projector.

Figure 2:
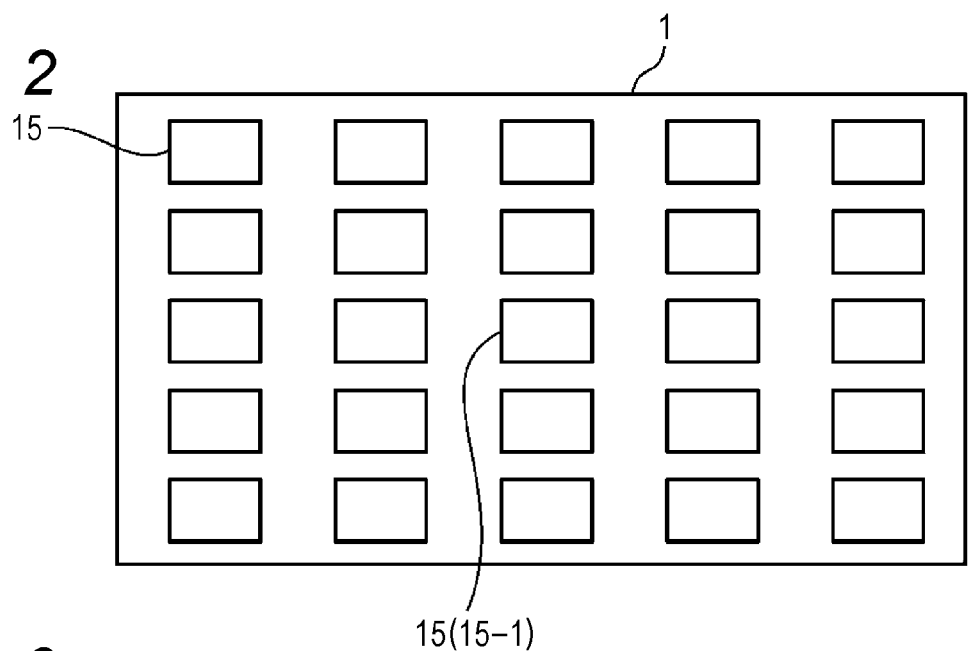
FIG. 2 is a schematic plan view of a DUT screen on which a plurality of measurement regions are set.

The two-dimensional flicker measurement apparatus 3 sets a plurality of measurement regions on the DUT screen 1 based on the instruction of the measurer, and measures flicker amounts for the plurality of measurement regions at the same time. FIG. 2 is a schematic plan view of the DUT screen 1 on which a plurality of measurement regions 15 are set. Here, for example, 25 measurement regions 15 are set on the DUT screen 1.

Hereinafter, an example will be described in which the flicker amount is measured using luminance, but a photometric quantity (brightness) may be used. The two-dimensional flicker measurement apparatus 3 calculates a photometric quantity based on an image information signal obtained from the measurement target, and calculates the flicker amount based on the photometric quantity. The photometric quantity is a physical quantity that generically refers to luminance and an image information signal output from a two-dimensional imaging device provided in the two-dimensional flicker measurement apparatus 3. The luminance is obtained by performing arithmetic processing on the image information signal.

As a method of measuring the flicker amount, there are a contrast method and a Japan Electronics and Information Technology Industries Association (JEITA) method. The two-dimensional flicker measurement apparatus 3 measures the flicker amount using the contrast method, but may measure the flicker amount using the JEITA method.

Figure 3:
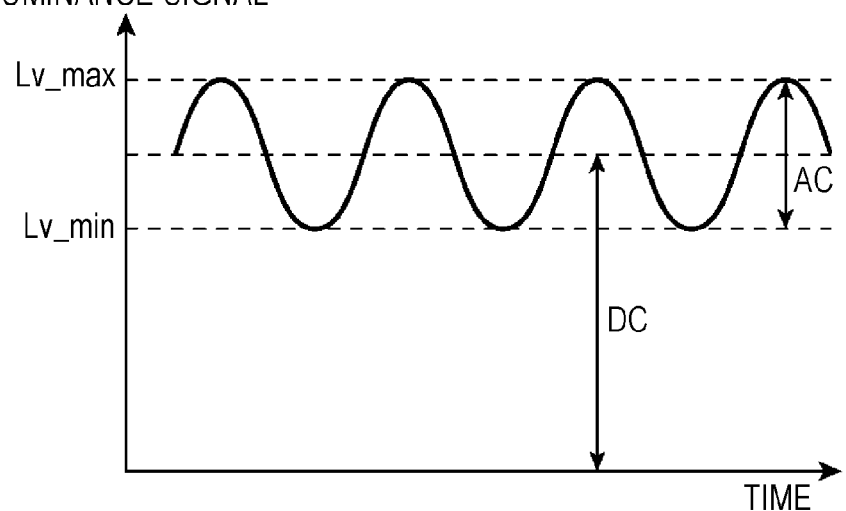
FIG. 3 is a graph showing an example of a luminance signal indicating the luminance of one measurement region.

FIG. 3 is a graph showing an example of a luminance signal indicating the luminance of one measurement region 15. The horizontal axis indicates time, and the vertical axis indicates luminance. The luminance signal can be regarded as a signal in which an AC component is superimposed on a DC component. The waveform of the luminance signal is generally a sine curve shape. Assuming that the maximum value of the luminance signal is Lv_max and the minimum value is Lv_min, Lv_max and Lv_min are alternately repeated.

The flicker amount based on the contrast method is defined by the following equation.

Flicker amount=AC component AC/DC component DC

Figure 4:
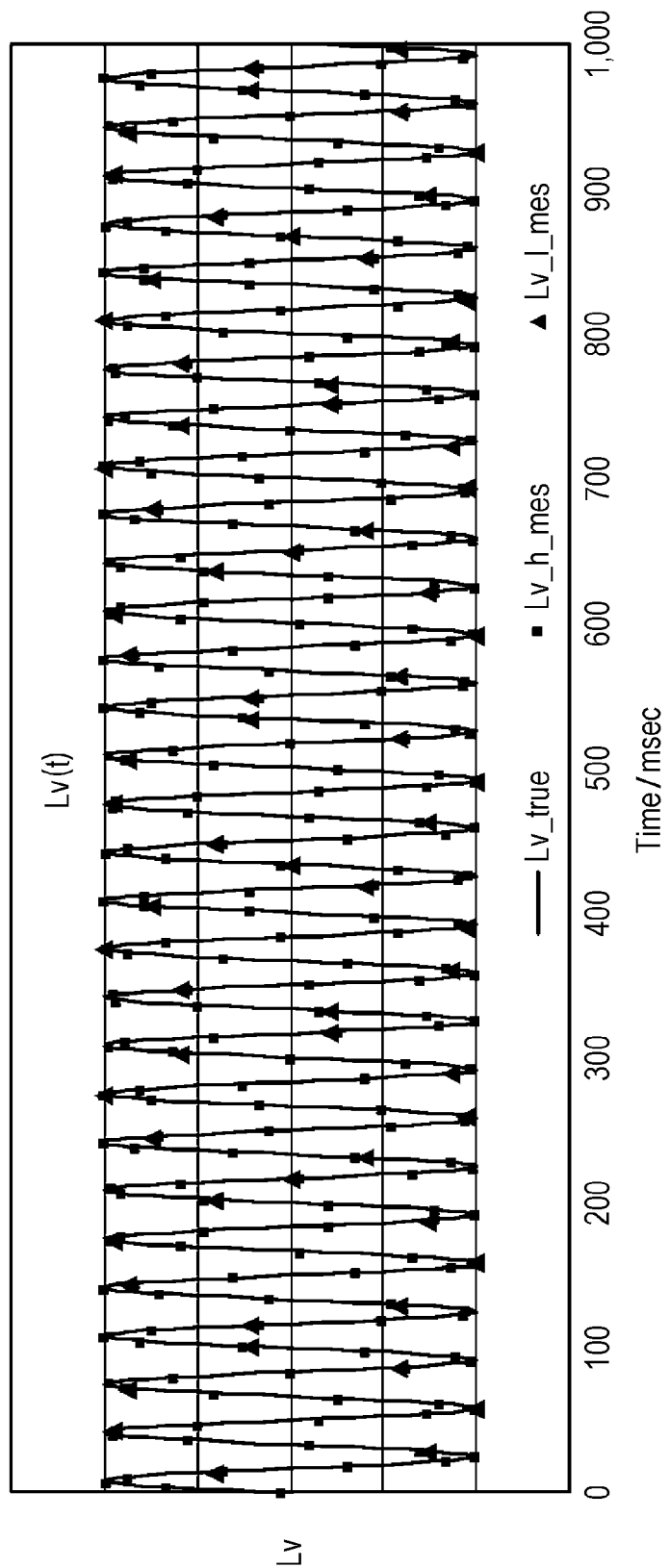
FIG. 4 is a graph showing a result of measurement of a luminance signal indicating the luminance of one measurement region by the present inventor.
Figure 5:
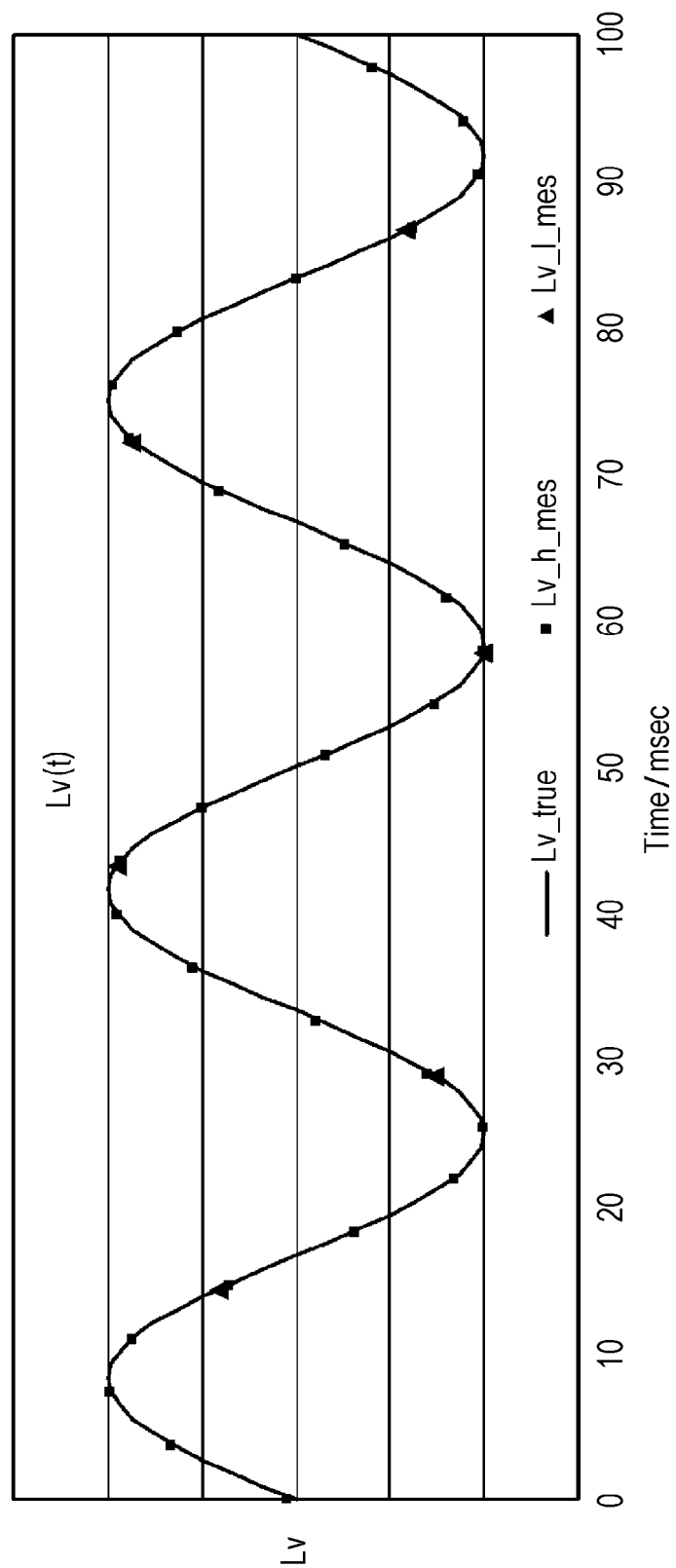
FIG. 5 is a graph obtained by enlarging the graph shown in FIG. 4 along the horizontal axis.

The fact that the measurement value of the flicker amount becomes smaller than the true value of the flicker amount when the sampling frequency of the luminance signal becomes lower will be described. FIG. 4 is a graph showing a result of measurement of a luminance signal indicating the luminance of one measurement region 15 by the present inventor. The horizontal axis indicates time (millisecond), and the vertical axis indicates luminance. Lv_true is a true value of the luminance signal. Lv_true has a sine curve shape waveform, similar to the luminance signal shown in FIG. 3. Lv_h_mes indicates a sampling result of Lv_true at a high sampling frequency. Lv_l_mes indicates a sampling result Lv_true at a low sampling frequency. FIG. 5 is a graph obtained by enlarging the graph shown in FIG. 4 along the horizontal axis. Table 1 shows a maximum value, a minimum value, a DC component value, a flicker amount, and a flicker measurement error for each of Lv_true, Lv_h_mes, and Lv_l_mes.

TABLE 1

|  | Lv_true | Lv_h_mes | Lv_l_mes |
| --- | --- | --- | --- |
| Maximum value | 2.5000 | 2.5000 | 2.4945 |
| Minimum value | 0.5000 | 0.5000 | 0.5055 |
| DC component value | 1.5000 | 1.5002 | 1.5075 |
| Flicker amount | 1.3333 | 1.3332 | 1.3194 |
| Flicker measurement error | — | −0.01% | −1.04% |

Referring to Table 1 and FIG. 5, Lv_h_mes has a small sampling interval (high sampling frequency). Therefore, since Lv_h_mes can approximately have the maximum value of Lv_true, the maximum value of Lv_h_mes is approximately the same as the maximum value of Lv_true. Similarly, since Lv_h_mes can approximately have the minimum value of Lv_true, the minimum value of Lv_h_mes is approximately the same as the minimum value of Lv_true. For the DC component value, Lv_true is 1.5000, whereas Lv_h_mes is 1.5002. For the flicker amount, Lv_true is 1.3333, whereas Lv_h_mess is 1.3332. The flicker measurement error, which is the difference from the true value, is −0.01%.

On the other hand, Lv_l_mes has a large sampling interval (low sampling frequency). Therefore, since the maximum value of Lv_true cannot be obtained, a smaller value (=2.4945) is obtained. For the same reason, since the minimum value of Lv_true cannot be obtained, and a larger value (=0.5055) is obtained. For the value of the DC component, Lv_true is 1.5000, whereas Lv_l_mes is 1.5075. For the flicker amount, Lv_true is 1.3333, whereas Lv_l_mess is 1.3194. The flicker measurement error, which is the difference from the true value, is −1.04%. The high-speed sampling has a smaller flicker measurement error (the difference from the true value) than the low-speed sampling. As described above, as the sampling frequency becomes lower, the measurement value of the flicker amount becomes smaller than the true value of the flicker amount.

Figure 6:
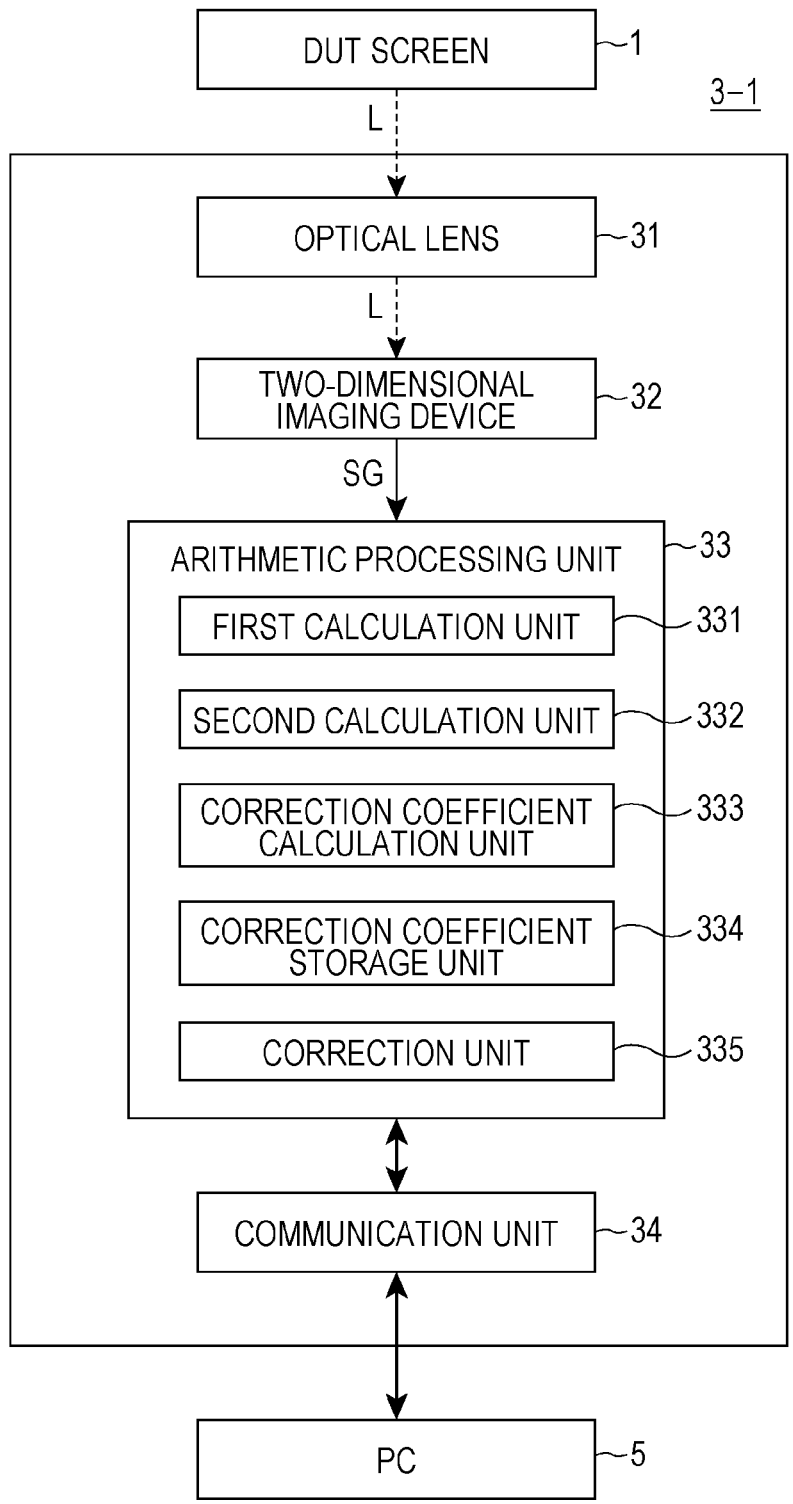
FIG. 6 is a block diagram illustrating the configuration of a two-dimensional flicker measurement apparatus according to a first embodiment.

FIG. 6 is a block diagram illustrating the configuration of a two-dimensional flicker measurement apparatus 3-1 according to a first embodiment. The two-dimensional flicker measurement apparatus 3-1 includes an optical lens 31, a two-dimensional imaging device 32, an arithmetic processing unit 33, and a communication unit 34. The optical lens 31 converges light L from the entire DUT screen 1. The light L converged by the optical lens 31 is received by the two-dimensional imaging device 32.

The two-dimensional imaging device 32 (photometric unit) is, for example, a CMOS sensor, and is an image sensor having a two-dimensional imaging region. The two-dimensional imaging device 32 images the DUT screen 1 on which an image is displayed at a predetermined frame rate, and outputs a signal indicating luminance information (hereinafter, a luminance signal SG) of the captured image. The luminance signal SG is a digital electrical signal.

The two-dimensional imaging device 32 has an all reading mode and a partial reading mode. The all reading mode is a mode in which the DUT screen 1 is imaged at a first frame rate with all light receiving elements of the two-dimensional imaging device 32 as read targets. The first frame rate is a low frame rate (relatively low frame rate), for example, 168 fps, 128 fps, and 60 fps.

The partial reading mode is a mode in which the DUT screen 1 is imaged at a second frame rate higher than the first frame rate with a part of the imaging region of the two-dimensional imaging device 32 as a read target. The partial reading is a function of the two-dimensional imaging device. This is a mode in which a part of the imaging region corresponds to a predetermined measurement region 15-1 illustrated in FIG. 7, which will be described later, and only image information of the predetermined measurement region 15-1 can be extracted. According to the partial reading, since the number of pixels to be read is reduced even in the normal two-dimensional imaging device 32, image information can be transferred at a high frame rate, such as 512 fps (relatively high frame rate), for example. Therefore, even in the normal two-dimensional imaging device 32, image information can be extracted at a high sampling frequency.

The frame rate (first frame rate, second frame rate) of the two-dimensional imaging device 32 can be regarded as a sampling frequency. Therefore, in the case of the two-dimensional imaging device 32, the frame rate and the sampling frequency have the same value except for the units. The value of the frame rate becomes a sampling frequency if the unit is changed from fps to Hz. For example, when the frame rate is 512 fps, the sampling frequency is 512 Hz. The luminance signal SG output from the two-dimensional imaging device 32 at 512 fps is a digital signal sampled at 512 Hz.

As described above, the two-dimensional imaging device 32 is a specific example of a photometric unit. The photometric unit has a first function of performing photometry in a two-dimensional region at a first sampling frequency (for example, 128 Hz) and a second function of performing photometry in a region smaller than the two-dimensional region at a second sampling frequency (for example, 512 Hz) higher than the first sampling frequency. In the first embodiment, the all reading mode is the first function, and the partial reading mode is the second function.

In addition, the two-dimensional flicker measurement apparatus 3-1 and the following light receiving device (not illustrated) may be provided. For example, the light receiving device is provided in a spot type luminance meter, and includes a light receiving element (for example, a silicon photodiode) that receives light from the predetermined measurement region 15-1 (spot region) and an AD conversion circuit that converts a signal (luminance signal), which is output from the light receiving element, from an analog signal to a digital signal at a high sampling frequency. The signal (luminance signal) output from the AD conversion circuit is input to the arithmetic processing unit 33. In this embodiment, the partial reading function of the two-dimensional imaging device 32 is not used. In this embodiment, a luminance signal of a predetermined measurement region 15 sampled at a high sampling frequency is obtained using the light receiving device. In this embodiment, the photometric unit is configured by the light receiving device and the two-dimensional imaging device 32.

The arithmetic processing unit 33 is a hardware processor that executes various settings and calculations necessary for measuring the flicker amount. Specifically, the arithmetic processing unit 33 is a microcomputer realized by a central processing unit (CPU), a random access memory (RAM), a read only memory (ROM), and the like. The arithmetic processing unit 33 includes, as functional blocks, a first calculation unit 331, a second calculation unit 332, a correction coefficient calculation unit 333, a correction coefficient storage unit 334, and a correction unit 335. These will be described later.

In addition, some or all of the functions of the arithmetic processing unit 33 may be realized by processing of a field programmable gate array (FPGA) instead of or together with processing of the CPU. Also, similarly, some or all of the functions of the arithmetic processing unit 33 may be realized by processing of a dedicated hardware circuit instead of or together with processing of software.

The communication unit 34 is a communication interface through which the two-dimensional flicker measurement apparatus 3-1 communicates with an external personal computer (PC) 5. By operating the PC 5, the measurer gives the two-dimensional flicker measurement apparatus 3-1 an instruction to execute various settings necessary for measuring the flicker amount (for example, designation of the center position of the measurement region 15 and designation of the number of measurement regions 15) and measurement of the flicker amount.

The components of the arithmetic processing unit 33 will be described. The first calculation unit 331 calculates the flicker amount of each of the 25 measurement regions 15 (FIG. 2) set on the DUT screen 1 based on the luminance signal SG obtained by imaging the DUT screen 1, on which an image is displayed, at the first frame rate (all reading mode) by the two-dimensional imaging device 32. The luminance signal SG is a signal sampled using the first sampling frequency (low sampling frequency). In other words, the first calculation unit 331 calculates the flicker amount of each of the 25 measurement regions 15 set on the DUT screen 1 based on the photometric quantity of the DUT screen 1 obtained by performing photometry on the DUT screen 1, on which an image is displayed, at the first sampling frequency by the photometric unit (two-dimensional imaging device 32). When the first frame rate is, for example, 128 fps, the first sampling frequency is 128 Hz. An example will be described in which 25 measurement regions 15 are a plurality of measurement regions 15, but the number of the plurality of measurement regions 15 is not limited to 25.

Figure 7:
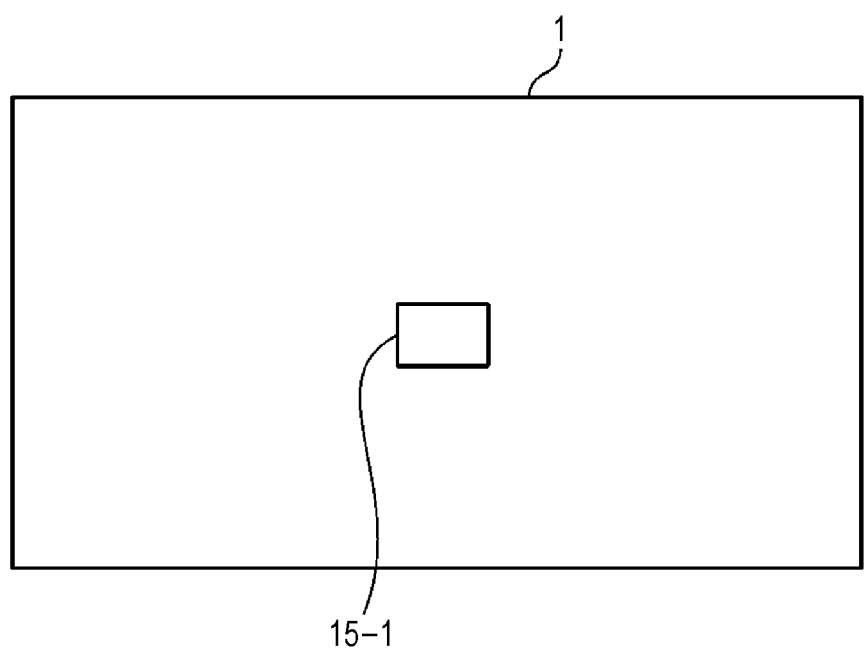
FIG. 7 is a schematic diagram illustrating a state where a predetermined measurement region is set on the DUT screen illustrated in FIG. 2.

The first calculation unit 331 calculates the flicker amount of the predetermined measurement region 15-1 set on the DUT screen 1 based on the luminance signal SG obtained by imaging the DUT screen 1, on which an image is displayed, at the first frame rate (all reading mode) by the two-dimensional imaging device 32. In other words, the first calculation unit 331 calculates the flicker amount of the predetermined measurement region 15-1 based on the photometric quantity of the predetermined measurement region 15-1 obtained by performing photometry in the predetermined measurement region 15-1 set on the DUT screen 1, on which an image is displayed, at the first sampling frequency by the photometric unit (two-dimensional imaging device 32). The predetermined measurement region 15-1 will be described. FIG. 7 is a schematic diagram illustrating a state where the predetermined measurement region 15-1 is set on the DUT screen 1 illustrated in FIG. 2. The number of predetermined measurement regions 15-1 is one. Among the 25 measurement regions 15 illustrated in FIG. 2, the measurement region 15 located at the center of the DUT screen 1 is the predetermined measurement region 15-1. The predetermined measurement region 15-1 is set at the center of the DUT screen 1, but is not limited to this position. Although one of the 25 measurement regions 15 is set as the predetermined measurement region 15-1, a region provided separately from the 25 measurement regions 15 may be set as the predetermined measurement region 15-1.

Referring to FIG. 6, the second calculation unit 332 calculates the flicker amount of the predetermined measurement region 15-1 based on the luminance signal SG obtained by imaging the DUT screen 1, on which an image is displayed, at the second frame rate (partial reading mode) by the two-dimensional imaging device 32. The luminance signal is a signal sampled using the second sampling frequency (high sampling frequency). In other words, the second calculation unit 332 calculates the flicker amount of the predetermined measurement region 15-1 based on the photometric quantity of the predetermined measurement region 15-1 obtained by performing photometry in the predetermined measurement region 15-1 set on the DUT screen 1, on which an image is displayed, at the second sampling frequency by the photometric unit (two-dimensional imaging device 32). When the second frame rate is, for example, 512 fps, the second sampling frequency is 512 Hz.

The correction coefficient calculation unit 333 calculates a correction coefficient. The correction coefficient is defined by the flicker amount of the predetermined measurement region 15-1 calculated by the second calculation unit 332 and the flicker amount of the predetermined measurement region 15-1 calculated based on the luminance signal indicating the luminance of the predetermined measurement region 15-1 obtained by imaging the DUT screen 1, on which an image is displayed, at the first frame rate by the two-dimensional imaging device 32. In other words, the correction coefficient is defined by the flicker amount of the predetermined measurement region 15-1 calculated by the second calculation unit 332 and the flicker amount of the predetermined measurement region 15-1 calculated based on the photometric quantity of the predetermined measurement region 15-1 obtained by performing photometry in the predetermined measurement region 15-1 at the first sampling frequency by the photometric unit (two-dimensional imaging device 32). In addition, in other words, the correction coefficient is defined by the flicker amount calculated using the second sampling frequency (high sampling frequency) and the flicker amount calculated using the first sampling frequency (low sampling frequency) for the predetermined measurement region 15-1. In the first embodiment, the correction coefficient defined by the flicker amount of the predetermined measurement region 15-1 calculated by the second calculation unit 332 and the flicker amount of the predetermined measurement region 15-1 calculated by the first calculation unit 331 is used.

The correction coefficient is expressed by the following Equation 1, for example.

$$k = Fc\_h / Fc\_l \qquad \text{Equation 1}$$

Here, k is a correction coefficient. $Fc\_h$ is a flicker amount calculated using the second sampling frequency for the predetermined measurement region 15-1. $Fc\_l$ is a flicker amount calculated using the first sampling frequency for the predetermined measurement region 15-1.

Since the correction coefficient does not depend on the location (position), one correction coefficient that is applied in common to 25 measurement regions 15 is required (25 correction coefficients corresponding to the 25 measurement regions 15 are not required).

The correction coefficient storage unit 334 stores a correction coefficient before measuring the flicker amount of each of the 25 measurement regions 15 set on the DUT screen 1.

The correction unit 335 corrects the flicker amount of each of the 25 measurement regions 15 calculated by the first calculation unit 331 using the correction coefficient stored in the correction coefficient storage unit 334.

Figure 8:
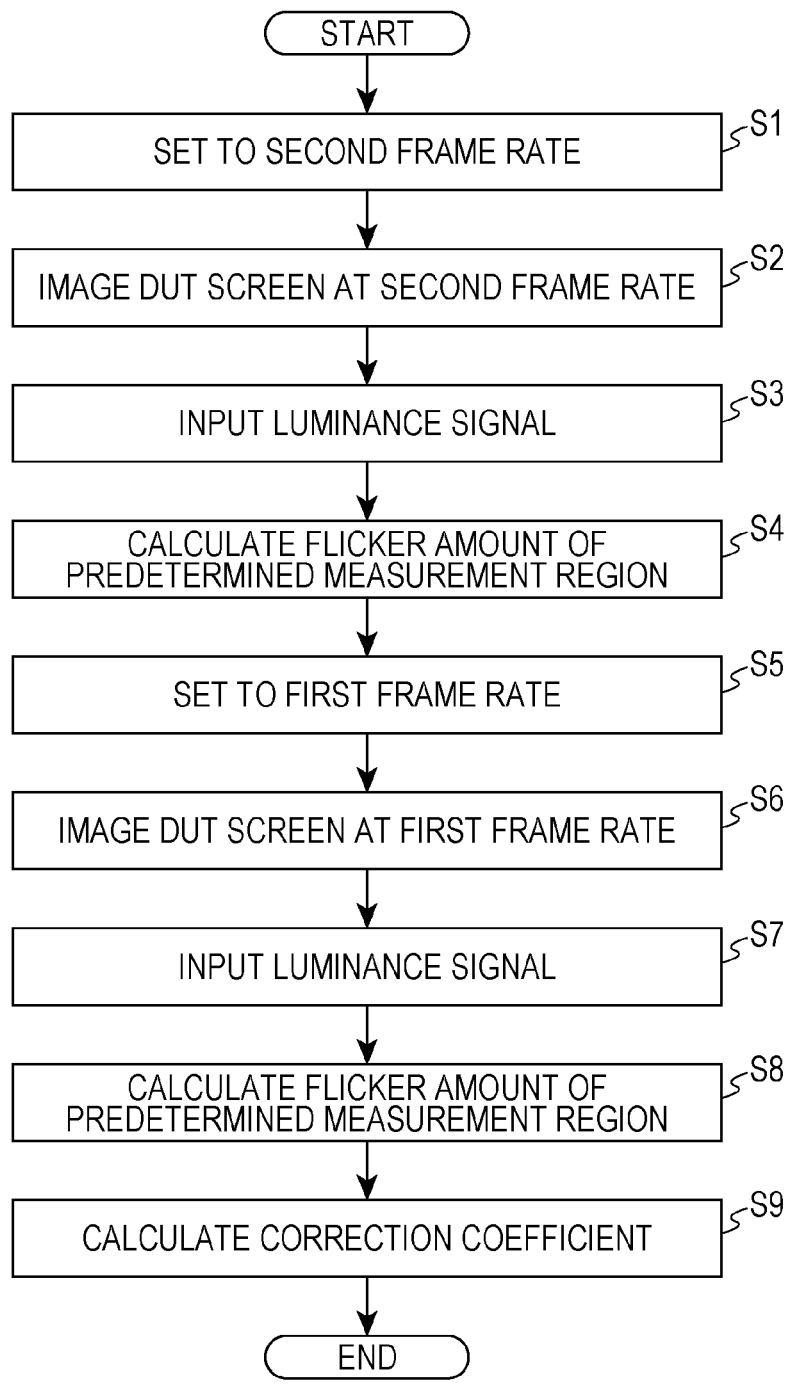
FIG. 8 is a flowchart describing an operation of calculating a correction coefficient using the two-dimensional flicker measurement apparatus according to the first embodiment.

An operation of calculating the correction coefficient using the two-dimensional flicker measurement apparatus 3-1 according to the first embodiment will be described. FIG. 8 is a flowchart describing this operation.

Referring to FIG. 6, the measurer operates the PC 5 to input a command for calculating the correction coefficient to the two-dimensional flicker measurement apparatus 3-1. Then, the arithmetic processing unit 33 sets the two-dimensional imaging device 32 to the partial reading mode, and sets the frame rate of the two-dimensional imaging device 32 to the second frame rate (for example, 512 fps) (step S1 in FIG. 8). In other words, the second frame rate is the second sampling frequency, which is 512 Hz at 512 fps.

The arithmetic processing unit 33 controls the two-dimensional imaging device 32 to image the DUT screen 1 on which an image is displayed, under the setting of step S1 (step S2 in FIG. 8). Then, the luminance signal SG output from the two-dimensional imaging device 32 is input to the arithmetic processing unit 33 over a preset period (time) (step S3 in FIG. 8). The luminance signal SG herein is a luminance signal indicating the luminance of the predetermined measurement region 15-1. The predetermined measurement region 15-1 corresponds to a partially read region of the imaging region of the two-dimensional imaging device 32.

The second calculation unit 332 calculates the flicker amount of the predetermined measurement region 15-1 based on the luminance signal SG input to the arithmetic processing unit 33 in step S3 (step S4 in FIG. 8). The flicker amount herein is the flicker amount (Fc_h) calculated using the second sampling frequency for the predetermined measurement region 15-1.

Then, the arithmetic processing unit 33 changes the setting of the two-dimensional imaging device 32 from the partial reading mode to the all reading mode. Therefore, the arithmetic processing unit 33 sets the frame rate of the two-dimensional imaging device 32 to the first frame rate (for example, 128 fps) (step S5 in FIG. 8). In other words, the first frame rate is the first sampling frequency, which is 128 Hz at 128 fps.

The arithmetic processing unit 33 controls the two-dimensional imaging device 32 to image the DUT screen 1 on which an image is displayed, under the setting of step S5 (step S6 in FIG. 8). Then, the luminance signal SG output from the two-dimensional imaging device 32 is input to the arithmetic processing unit 33 over a preset period (time) (step S7 in FIG. 8). The luminance signal SG herein is a luminance signal indicating the luminance of the entire region of the DUT screen 1. The entire region of the DUT screen 1 includes 25 measurement regions 15 (a plurality of measurement regions 15) illustrated in FIG. 2.

The first calculation unit 331 calculates the flicker amount of the predetermined measurement region 15-1 based on the luminance signal SG of the predetermined measurement region 15-1 among the luminance signals SG input to the arithmetic processing unit 33 in step S7 (step S8 in FIG. 8). The flicker amount herein is the flicker amount (Fc_l) calculated using the first sampling frequency for the predetermined measurement region 15-1.

The correction coefficient calculation unit 333 calculates a correction coefficient using the flicker amount (Fc_h) calculated in step S4, the flicker amount (Fc_l) calculated in step S8, and Equation 1 (step S9 in FIG. 8). The correction coefficient is applied in common to the 25 measurement regions 15. The correction coefficient calculation unit 333 stores the calculated correction coefficient in the correction coefficient storage unit 334. In addition, the correction coefficient may be calculated and stored in the correction coefficient storage unit 334 before shipping the two-dimensional flicker measurement apparatus 3-1 from the factory. According to this, the measurer (user) does not need to calculate the correction coefficient using the two-dimensional flicker measurement apparatus 3-1.

Figure 9:
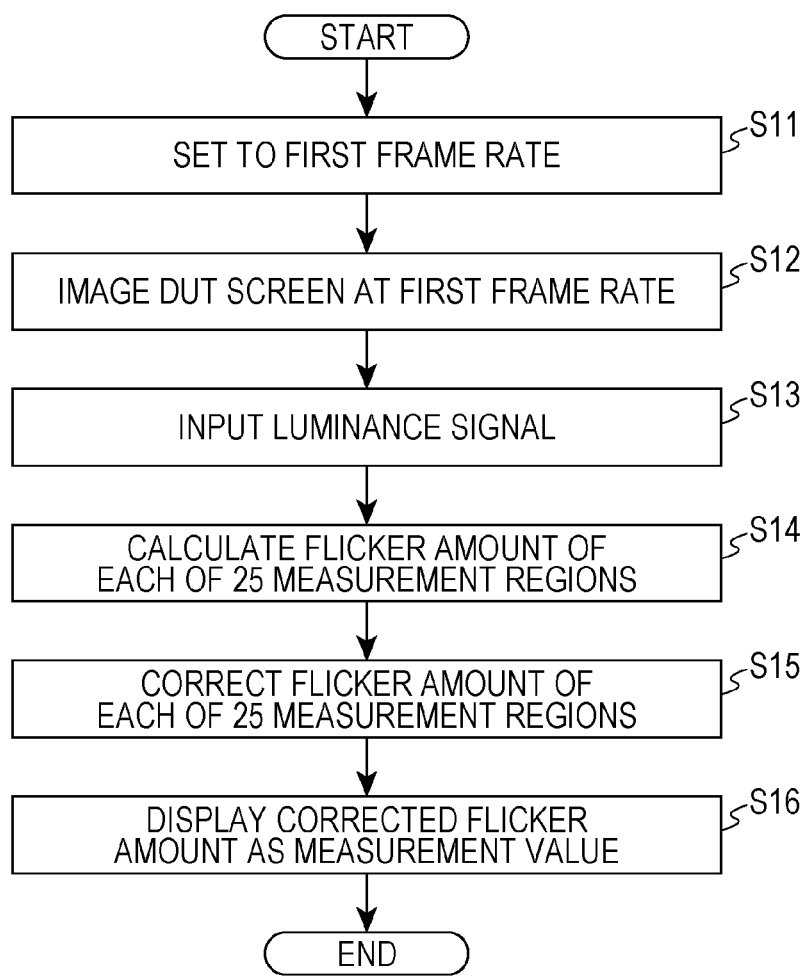
FIG. 9 is a flowchart describing an operation of measuring the flicker amount of each of 25 measurement regions in the DUT screen using the two-dimensional flicker measurement apparatus according to the first embodiment.

Next, an operation of measuring the flicker amount of each of the 25 measurement regions 15 set on the DUT screen 1 using the two-dimensional flicker measurement apparatus 3-1 according to the first embodiment will be described. FIG. 9 is a flowchart describing this.

Referring to FIG. 6, the measurer operates the PC 5 to input a command for measuring the flicker amount to two-dimensional flicker measurement apparatus 3-1. Then, the arithmetic processing unit 33 sets the two-dimensional imaging device 32 to the all reading mode, and sets the frame rate of the two-dimensional imaging device 32 to the first frame rate (step S11 in FIG. 9). The first frame rate in step S11 is the same value as the first frame rate in step S5 in FIG. 8. Here, the first frame rate is 128 fps.

The arithmetic processing unit 33 controls the two-dimensional imaging device 32 to image the DUT screen 1 on which an image is displayed, under the setting of step S11 (step S12 in FIG. 9). Then, the luminance signal SG output from the two-dimensional imaging device 32 is input to the arithmetic processing unit 33 (step S13 in FIG. 9). The luminance signal SG herein is a luminance signal indicating the luminance of the entire region of the DUT screen 1. The entire region of the DUT screen 1 includes 25 measurement regions 15 (a plurality of measurement regions 15) illustrated in FIG. 2.

The first calculation unit 331 calculates the flicker amount of each of the 25 measurement regions 15 based on the luminance signal SG input to the arithmetic processing unit 33 in step S13 (step S14 in FIG. 9). The flicker amount herein is a flicker amount calculated using the first sampling frequency for each of the 25 measurement regions 15.

The correction unit 335 corrects the flicker amount of each of the 25 measurement regions 15 calculated in step S14 using the correction coefficients stored in the correction coefficient storage unit 334 (step S15 in FIG. 9). The following Equation 2 is used for this correction.

$$F(x,y)\_\text{true} = k \times F(x,y)\_1\_mes \quad \text{Equation 2}$$

Here, k is a correction coefficient. $F(x, y)\_1\_mes$ indicates the flicker amount of each of the 25 measurement regions 15 calculated by the first calculation unit 331 in step S14. $F(x, y)\_\text{true}$ indicates the flicker amount of each of the 25 measurement regions 15 corrected in step S15. (x, y) indicates the coordinates of the center point of each of the 25 measurement regions 15.

Specifically, a value obtained by multiplying the flicker amount of the first measurement region 15 calculated by the first calculation unit 331 by the correction coefficient is a corrected flicker amount for the first measurement region 15, a value obtained by multiplying the flicker amount of the second measurement region 15 calculated by the first calculation unit 331 by the correction coefficient is a corrected flicker amount for the second measurement region 15, . . . , and a value obtained by multiplying the flicker amount of the twenty-fifth measurement region 15 calculated by the first calculation unit 331 by the correction coefficient is a corrected flicker amount for the twenty-fifth measurement region 15.

The arithmetic processing unit 33 transmits the corrected flicker amount for each of the 25 measurement regions 15 to the PC 5 using the communication unit 34. The PC 5 displays these flicker amounts on the screen of the PC 5 as measurement values of the flicker amounts of the 25 measurement regions 15 (step S16 in FIG. 9).

As described above, the two-dimensional flicker measurement apparatus 3-1 according to the first embodiment calculates a flicker amount for each of the 25 measurement regions 15 (the plurality of measurement regions 15) using the first sampling frequency (low sampling frequency) (step S14 in FIG. 9), and corrects the flicker amount using the correction coefficient (step S15 in FIG. 9). Therefore, the flicker amount of each of the 25 measurement regions 15 set on the DUT screen 1 can be measured with high accuracy using a low sampling frequency.

In addition, interpolation (Lagrange interpolation or the like) may be performed on the luminance signal SG indicating the luminance of the DUT screen 1 obtained by imaging the DUT screen 1, on which an image is displayed, at the first frame rate by the two-dimensional imaging device 32 (steps S12 and S13 in FIG. 9). According to this, the flicker amount of each of the 25 measurement regions 15 set on the DUT screen 1 can be measured with high accuracy even without a correction coefficient.

Modification examples of the first embodiment will be described. Modification example 1 will be described with reference to FIG. 6. In Modification example 1, it is possible to change the correction coefficient according to the value of the driving frequency (frequency of the vertical synchronization signal) of the DUT screen 1. For example, it is assumed that the driving frequency of the first DUT screen 1 is f1 and the driving frequency of the second DUT screen 1 is f2 (f1≠f2). It is assumed that the correction coefficient is k1 in the case of the driving frequency f1 and the correction coefficient is k2 in the case of the driving frequency f2 (k1≠k2). The correction coefficient storage unit 334 stores the driving frequency f1 and the correction coefficient k1 so as to be associated with each other, and stores the driving frequency f2 and the correction coefficient k2 so as to be associated with each other. That is, the correction coefficient storage unit 334 stores a plurality of correction coefficients, which are calculated according to the value of the driving frequency of the DUT screen 1, in advance.

When the driving frequency of the DUT screen 1 is f1 (in the case of the first DUT screen 1), the correction unit 335 reads the correction coefficient k1 from the correction coefficient storage unit 334, and corrects the flicker amount of each of the 25 measurement regions 15 calculated by the first calculation unit 331 using the correction coefficient k1. The driving frequency of the DUT screen 1 may be automatically measured by the two-dimensional flicker measurement apparatus 3-1 using a known technique, or the measurer may input the driving frequency of the DUT screen 1 to the two-dimensional flicker measurement apparatus 3-1 using the PC 5.

When the driving frequency of the DUT screen 1 is f2 (in the case of the second DUT screen 1), the correction unit 335 reads the correction coefficient k2 from the correction coefficient storage unit 334, and corrects the flicker amount of each of the 25 measurement regions 15 calculated by the first calculation unit 331 using the correction coefficient k2.

As described above, the correction unit 335 corrects the flicker amount of each of the 25 measurement regions 15 calculated by the first calculation unit 331 using the correction coefficient corresponding to the value of the driving frequency of the DUT screen 1 among the plurality of correction coefficients stored in the correction coefficient storage unit 334.

The correction coefficient changes according to the value of the driving frequency of the DUT screen 1. Therefore, when the same correction coefficient is used for the DUT screens 1 having different driving frequencies, the measurement accuracy of the flicker amount is reduced. According to Modification example 1, since the correction coefficient is changed according to the value of the driving frequency of the DUT screen 1, such a situation can be prevented.

Modification example 2 will be described with reference to FIG. 6. In Modification example 2, the correction coefficient is changed according to the value of the first frame rate (the first frame rate can be rephrased as the first sampling frequency). For example, it is assumed that the correction coefficient is k1 when the value of the first frame rate is v1 and the correction coefficient is k2 when the value of the first frame rate is v2 (v1≠v2, k1≠k2). The correction coefficient storage unit 334 stores the first frame rate v1 and the correction coefficient k1 so as to be associated with each other, and stores the first frame rate v2 and the correction coefficient k2 so as to be associated with each other. As described above, the correction coefficient storage unit 334 stores a plurality of correction coefficients, which are calculated according to the value of the first frame rate, in advance.

Before measuring the flicker amount of each of the 25 measurement regions 15, the measurer inputs the value of the first frame rate to the two-dimensional flicker measurement apparatus 3-1 using the PC 5 (first input unit). When the first frame rate v1 is input, the correction unit 335 reads the correction coefficient k1 from the correction coefficient storage unit 334, and corrects the flicker amount of each of the 25 measurement regions 15 calculated by the first calculation unit 331 using the correction coefficient k1. When the first frame rate v2 is input, the correction unit 335 reads the correction coefficient k2 from the correction coefficient storage unit 334, and corrects the flicker amount of each of the 25 measurement regions 15 calculated by the first calculation unit 331 using the correction coefficient k2.

As described above, when the value of the first frame rate is designated using the PC 5, the correction unit 335 corrects the flicker amount of each of the 25 measurement regions 15 calculated by the first calculation unit 331 using the correction coefficient corresponding to the value designated using the PC 5 among the plurality of correction coefficients stored in the correction coefficient storage unit 334.

The correction coefficient changes according to the value of the first frame rate. Therefore, regardless of the value of the first frame rate, if the same correction coefficient is used, the measurement accuracy of the flicker amount is reduced. According to Modification example 2, since the value of the correction coefficient is changed according to the value of the first frame rate, such a situation can be prevented.

Modification example 3 will be described with reference to FIG. 6. Modification example 3 is a combination of Modification example 1 and Modification example 2. For example, it is assumed that the driving frequency of the first DUT screen 1 is f1, the driving frequency of the second DUT screen 1 is f2 (f1≠f2), and the value of the first frame rate is v1 and v2 (v1≠v2). The first frame rate can be rephrased as a first sampling frequency. It is assumed that the correction coefficient is k1 in the case of a combination of the driving frequency f1 and the first frame rate v1, the correction coefficient is k2 in the case of a combination of the driving frequency f1 and the first frame rate v2, the correction coefficient is k3 in the case of a combination of the driving frequency f2 and the first frame rate v1, and the correction coefficient is k4 in the case of a combination of the driving frequency f2 and the first frame rate v2 (k1, k2, k3, and k4 are different values).

The correction coefficient storage unit 334 stores the combination of the driving frequency f1 and the first frame rate v1 and the correction coefficient k1 so as to be associated with each other, stores the combination of the driving frequency f1 and the first frame rate v2 and the correction coefficient k2 so as to be associated with each other, stores the combination of the driving frequency f2 and the first frame rate v1 and the correction coefficient k3 so as to be associated with each other, and stores the combination of the driving frequency f2 and the first frame rate v2 and the correction coefficient k4 so as to be associated with each other. As described above, the correction coefficient storage unit 334 stores a plurality of correction coefficients, which are calculated according to the combination of the value of the driving frequency of the DUT screen 1 and the value of the first frame rate, in advance before the measurement of the flicker amount of each of the 25 measurement regions 15.

Before measuring the flicker amount of each of the 25 measurement regions 15, the measurer inputs the value of the first frame rate to the two-dimensional flicker measurement apparatus 3-1 using the PC 5 (second input unit). When the first frame rate v1 is input and the driving frequency of the DUT screen 1 is f1, the correction unit 335 reads the correction coefficient k1 from the correction coefficient storage unit 334, and corrects the flicker amount of each of the 25 measurement regions 15 calculated by the first calculation unit 331 using the correction coefficient k1. When the first frame rate v2 is input and the driving frequency of the DUT screen 1 is f1, the correction unit 335 reads the correction coefficient k2 from the correction coefficient storage unit 334, and corrects the flicker amount of each of the 25 measurement regions 15 calculated by the first calculation unit 331 using the correction coefficient k2. When the first frame rate v1 is input and the driving frequency of the DUT screen 1 is f2, the correction unit 335 reads the correction coefficient k3 from the correction coefficient storage unit 334, and corrects the flicker amount of each of the 25 measurement regions 15 calculated by the first calculation unit 331 using the correction coefficient k3. When the first frame rate v2 is input and the driving frequency of the DUT screen 1 is f2, the correction unit 335 reads the correction coefficient k4 from the correction coefficient storage unit 334, and corrects the flicker amount of each of the 25 measurement regions 15 calculated by the first calculation unit 331 using the correction coefficient k4.

As described above, when the value of the first frame rate is designated using the PC 5 (second input unit), the correction unit 335 corrects the flicker amount of each of the 25 measurement regions 15 calculated by the first calculation unit 331 using the correction coefficient corresponding to the combination of the value designated using the PC 5 and the value of the driving frequency of the DUT screen 1 among the plurality of correction coefficients stored in the correction coefficient storage unit 334.

According to Modification example 3, the same effects as those of Modification examples 1 and 2 are obtained.

Modification example 4 will be described with reference to FIGS. 6 and 9. In Modification example 4, the measurer can select whether or not to correct the flicker amount. Before measuring the flicker amount of each of the 25 measurement regions 15, the measurer inputs an instruction as to whether or not to correct the flicker amount to the two-dimensional flicker measurement apparatus 3-1 using the PC 5 (third input unit). When an instruction to correct the flicker amount is input, the correction unit 335 corrects the flicker amount of each of the 25 measurement regions 15 calculated by the first calculation unit 331 in step S14 (step S15).

On the other hand, when an instruction to correct no flicker amount is input, the correction unit 335 does not correct the flicker amount of each of the 25 measurement regions 15 calculated by the first calculation unit 331 in step S14. That is, the processing of step S15 is not performed. The arithmetic processing unit 33 transmits the flicker amount (flicker amount that is not corrected) of each of the 25 measurement regions 15 calculated by the first calculation unit 331 in step S14 to the PC 5 using the communication unit 34. The PC 5 displays these flicker amounts on the screen of the PC 5 as measurement values of the respective flicker amounts of the plurality of measurement regions 15.

Even if the flicker amount of each of the 25 measurement regions 15 calculated by the first calculation unit 331 is not corrected by the correction coefficient, the relative value of the flicker amount of each of the 25 measurement regions 15 can be known. If it is sufficient to use the relative value of the flicker amount of each of the 25 measurement regions 15, the measurer gives an instruction to correct no flicker amount using the PC 5 (third input unit).

Modification example 4 can also be applied to a second embodiment described below.

Figure 10:
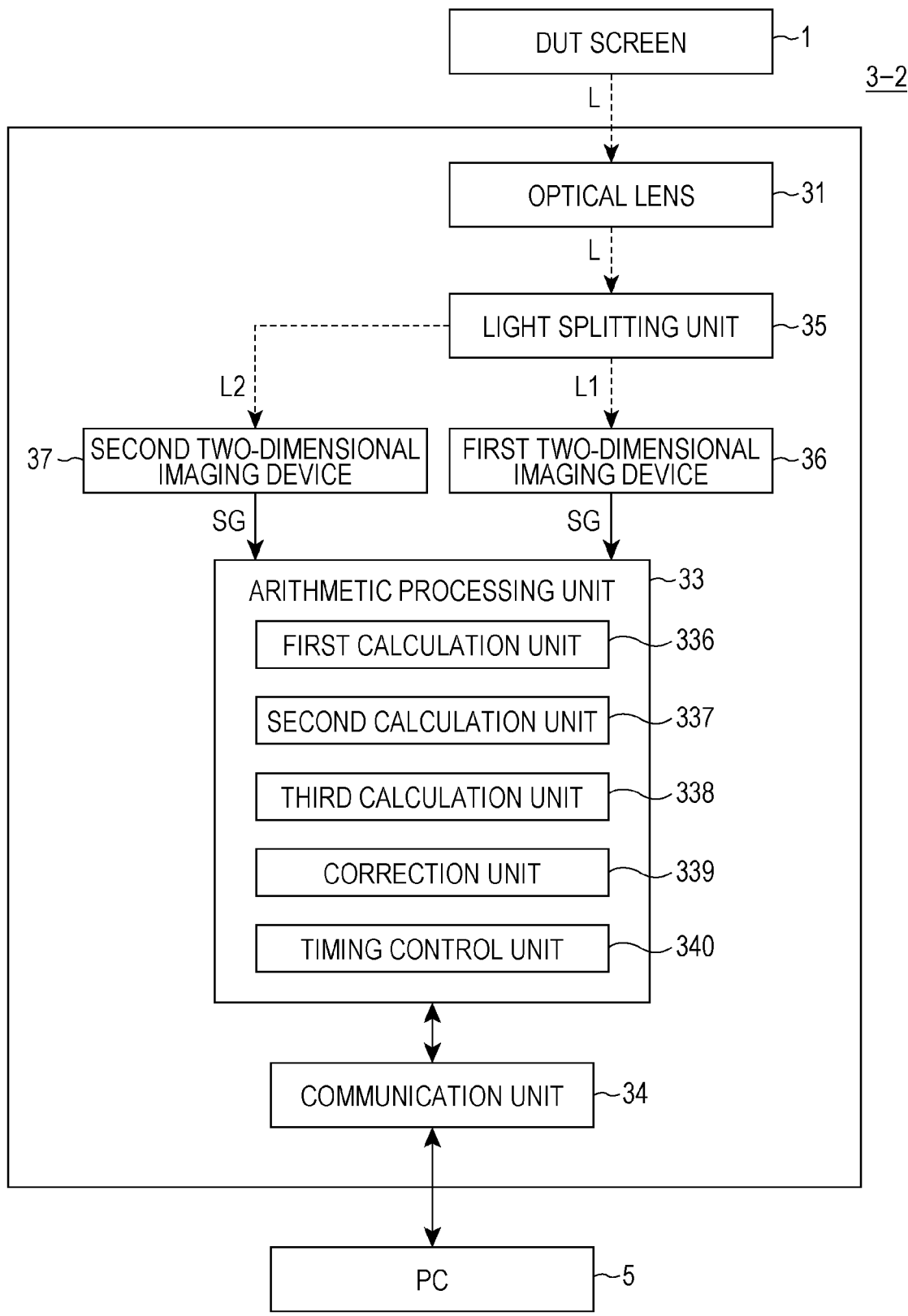
FIG. 10 is a block diagram illustrating the configuration of a two-dimensional flicker measurement apparatus according to a second embodiment.

The second embodiment will be described. FIG. 10 is a block diagram illustrating the configuration of a two-dimensional flicker measurement apparatus 3-2 according to the second embodiment. The two-dimensional flicker measurement apparatus 3-2 according to the second embodiment calculates a correction coefficient in real time when measuring the flicker amount of each of the 25 measurement regions 15. The difference between the two-dimensional flicker measurement apparatus 3-2 according to the second embodiment and the two-dimensional flicker measurement apparatus 3-1 according to the first embodiment will be described.

The two-dimensional flicker measurement apparatus 3-2 includes a light splitting unit 35 on which the light L passing through the optical lens 31 is incident. The light splitting unit 35 splits the light L into light L1 and light L2. The light splitting unit 35 is, for example, a half mirror.

Instead of the two-dimensional imaging device 32, the two-dimensional flicker measurement apparatus 3-2 includes a first two-dimensional imaging device 36 (first photometric unit) and a second two-dimensional imaging device 37 (second photometric unit) as photometric units. The first two-dimensional imaging device 36 is disposed in the optical path of the light L1 (one of the two split light components). The second two-dimensional imaging device 37 is disposed in the optical path of the light L2 (the other one of the two split light components).

The first two-dimensional imaging device 36 (first photometric unit) images the DUT screen 1, on which an image is displayed, at the first frame rate in the all reading mode, and outputs the luminance signal SG of the captured image. The first two-dimensional imaging device 36 is, for example, a CMOS sensor or a CCD sensor. As described above, the first photometric unit has a first function of performing photometry in a two-dimensional region at the first sampling frequency.

The second two-dimensional imaging device 37 (second photometric unit) images the DUT screen 1, on which an image is displayed, at the second frame rate in the partial reading mode, and outputs the luminance signal SG of the captured image. The second two-dimensional imaging device 37 is, for example, a CMOS sensor. As described above, the second photometric unit has a second function of performing photometry in a region smaller than the two-dimensional region at the second sampling frequency higher than the first sampling frequency.

Instead of the second two-dimensional imaging device 37, the following second photometric unit may be used. The second photometric unit includes a light receiving element (for example, a silicon photodiode) that receives light from the predetermined measurement region 15-1 (spot region) and an AD conversion circuit that converts a signal output from the light receiving element from an analog signal to a digital signal. According to the second photometric unit, since the signal transmission speed is high, partial reading is not necessary.

The luminance signal SG output from the first two-dimensional imaging device 36 and the luminance signal SG output from the second two-dimensional imaging device 37 are input to the arithmetic processing unit 33.

Figure 11:
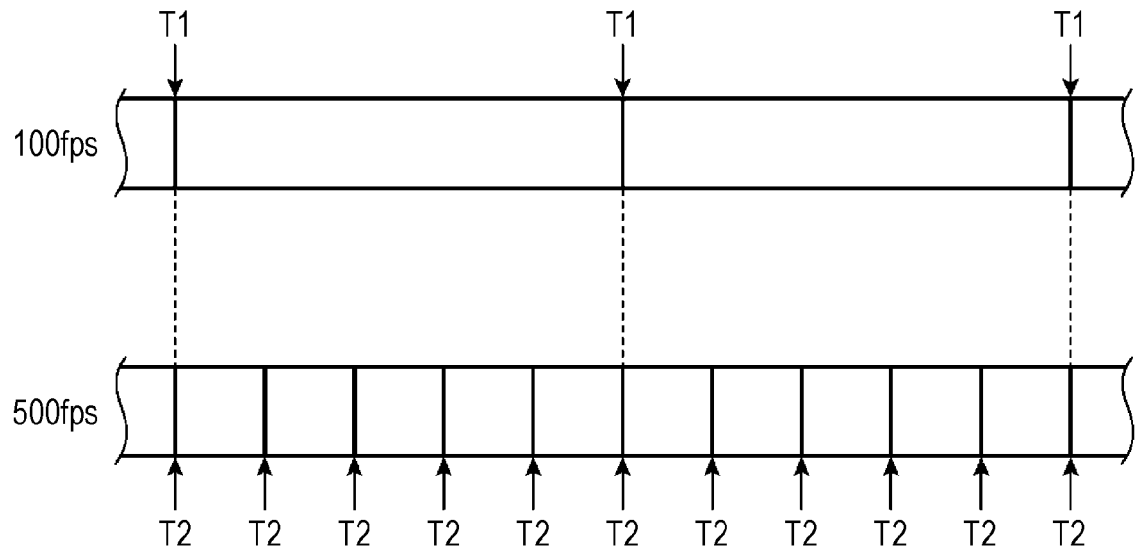
FIG. 11 is an explanatory diagram describing the control of imaging timing.

The arithmetic processing unit 33 includes a first calculation unit 336, a second calculation unit 337, a third calculation unit 338, a correction unit 339, and a timing control unit 340. Those other than the timing control unit 340 will be described later. The timing control unit 340 performs control such that imaging timings arranged in time series when the first two-dimensional imaging device 36 images the DUT screen 1, on which an image is displayed, at the first frame rate are included in imaging timings arranged in time series when the second two-dimensional imaging device 37 images the DUT screen 1, on which an image is displayed, at the second frame rate. FIG. 11 is an explanatory diagram describing the control of imaging timing. The second frame rate is an integer multiple of the first frame rate. Here, an example will be described in which the second frame rate is 500 fps and the first frame rate is 100 fps.

Since the frame rate of the first two-dimensional imaging device 36 is 100 fps, the imaging timings T1 are arranged in time series at 0.01 second intervals. Since the imaging timing T2 of the second two-dimensional imaging device 37 is 500 fps, the imaging timings T2 are arranged in time series at 0.002 second intervals. In order to eliminate the cause of the phase difference between the first two-dimensional imaging device 36 and the second two-dimensional imaging device 37, for example, the timing control unit 340 includes a frequency dividing circuit for dividing each reference clock into a 100 Hz clock and a 500 Hz clock. The first two-dimensional imaging device 36 uses a clock of 100 Hz as a timing signal, and performs imaging based on the timing signal. The second two-dimensional imaging device 37 uses a clock of 500 Hz as a timing signal, and performs imaging based on the timing signal. As a result, the imaging timing T2 of the second two-dimensional imaging device 37 becomes the same as the imaging timing T1 of the first two-dimensional imaging device 36 at periods of once every five times. This means that the imaging timings T1 arranged in time series when the first two-dimensional imaging device 36 images the DUT screen 1, on which an image is displayed, at the first frame rate are included in the imaging timings T2 arranged in time series when the second two-dimensional imaging device 37 images the DUT screen 1, on which an image is displayed, at the second frame rate.

Figure 12:
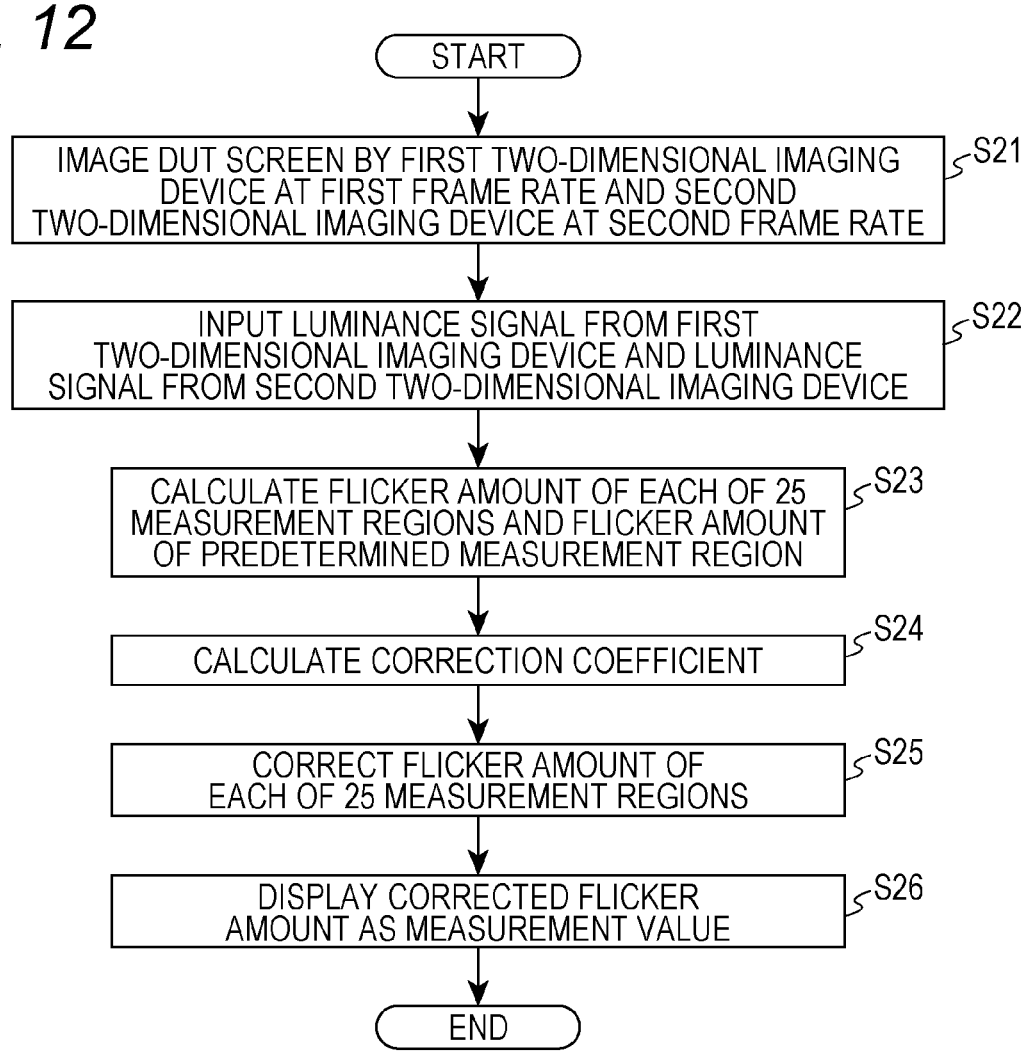
FIG. 12 is a flowchart describing the operation of the two-dimensional flicker measurement apparatus according to the second embodiment.

Next, the operation of a two-dimensional flicker measurement apparatus 3-2 according to the second embodiment will be described. FIG. 12 is a flowchart describing this operation.

Referring to FIG. 10, an image is displayed on the DUT screen 1, and the light splitting unit 35 splits the light L from the entire DUT screen 1 into the light L1 and the light L2. Accordingly, the light L1 is incident on the first two-dimensional imaging device 36, and the light L2 is incident on the second two-dimensional imaging device 37. The measurer operates the PC 5 to input a command for measuring the flicker amount to the two-dimensional flicker measurement apparatus 3-2. Then, the arithmetic processing unit 33 controls the first two-dimensional imaging device 36 to image the DUT screen 1, on which an image is displayed, at the first frame rate and the second two-dimensional imaging device 37 to image the DUT screen 1, on which an image is displayed, at the second frame rate (step S21 in FIG. 12). As described with reference to FIG. 11, the timing control unit 340 controls the imaging timing T1 of the first two-dimensional imaging device 36 and the imaging timing T2 of the second two-dimensional imaging device 37.

When the first two-dimensional imaging device 36 images the DUT screen 1 on which an image is displayed at the first frame rate, the first two-dimensional imaging device 36 outputs the luminance signal SG. When the second two-dimensional imaging device 37 images the DUT screen 1 on which an image is displayed at the second frame rate, the second two-dimensional imaging device 37 outputs the luminance signal SG. The luminance signal SG output from the first two-dimensional imaging device 36 and the luminance signal SG output from the second two-dimensional imaging device 37 are input to the arithmetic processing unit 33 (step S22 in FIG. 12). The luminance signal SG output from the first two-dimensional imaging device 36 is a luminance signal indicating the luminance of the entire region of the DUT screen 1. The entire region of the DUT screen 1 includes 25 measurement regions 15 (a plurality of measurement regions 15) illustrated in FIG. 2. The luminance signal SG output from the second two-dimensional imaging device 37 is a signal indicating the luminance of the predetermined measurement region 15-1. The predetermined measurement region 15-1 corresponds to a partially read region of the imaging region of the second two-dimensional imaging device 37.

The first calculation unit 336 calculates the flicker amount of each of the 25 measurement regions 15, and the second calculation unit 337 calculates the flicker amount of the predetermined measurement region 15-1 (step S23 in FIG. 12). Specifically, the first calculation unit 336 calculates the flicker amount of each of the 25 measurement regions 15 based on the luminance signal SG output from the first two-dimensional imaging device 36 and input to the arithmetic processing unit 33 (luminance signal SG that is obtained by imaging the DUT screen 1, on which an image is displayed, by the first two-dimensional imaging device 36 and that indicates the luminance of the DUT screen 1). In other words, the first calculation unit 336 calculates the flicker amount of each of the 25 measurement regions 15 based on the photometric quantity of the DUT screen 1 obtained by performing photometry on the DUT screen 1, on which an image is displayed, by the first photometric unit (first two-dimensional imaging device 36).

The second calculation unit 337 calculates the flicker amount of the predetermined measurement region 15-1 based on the luminance signal SG output from the second two-dimensional imaging device 37 and input to the arithmetic processing unit 33 (luminance signal SG that is obtained by imaging the DUT screen 1, on which an image is displayed, by the second two-dimensional imaging device 37 and that indicates the luminance of the predetermined measurement region 15-1). In other words, the second calculation unit 337 calculates the flicker amount of the predetermined measurement region 15-1 based on the photometric quantity of the predetermined measurement region 15-1 obtained by performing photometry in the predetermined measurement region 15-1 set on the DUT screen, on which an image is displayed, by the second photometric unit (second two-dimensional imaging device 37).

The third calculation unit 338 calculates a correction coefficient using the flicker amount of the central measurement region 15 (that is, the predetermined measurement region 15-1) among the flicker amounts of the 25 measurement regions 15 calculated by the first calculation unit 336, the flicker amount calculated by the second calculation unit 337, and Equation 1 (step S24 in FIG. 12).

The correction unit 339 corrects the flicker amount of each of the 25 measurement regions 15 calculated in step S23 using the correction coefficient calculated in step S24 (step S25 in FIG. 12). The above Equation 2 is used for this correction.

The arithmetic processing unit 33 transmits the corrected flicker amount for each of the 25 measurement regions 15 to the PC 5 using the communication unit 34. The PC 5 displays these flicker amounts on the screen of the PC 5 as measurement values of the flicker amounts of the 25 measurement regions 15 (step S26 in FIG. 12).

Main effects of the second embodiment will be described. In the second embodiment, a two-dimensional imaging device (first two-dimensional imaging device 36) that images the DUT screen 1 at the first frame rate and a two-dimensional imaging device (second two-dimensional imaging device 37) that images the DUT screen 1 at the second frame rate are separated. The light splitting unit 35 splits the light L from the DUT screen 1 into two light components, and the first two-dimensional imaging device 36 is disposed in the optical path of one L1 of the two split light components and the second two-dimensional imaging device 37 is disposed in the optical path of the other one L2 of the two split light components. Therefore, according to the second embodiment, when measuring the flicker amount of each of the 25 measurement regions 15, it is possible to calculate the correction coefficient in real time. As a result, it is possible to improve the measurement accuracy of the flicker amount of each of the 25 measurement regions 15.

SUMMARY OF EMBODIMENTS

A two-dimensional flicker measurement apparatus according to a first aspect of the embodiment includes: a photometric unit that has a first function of performing photometry in a two-dimensional region at a first sampling frequency and a second function of performing photometry in a region smaller than the two-dimensional region at a second sampling frequency higher than the first sampling frequency; a first calculation unit that calculates a flicker amount of each of a plurality of measurement regions set on a measurement target based on a photometric quantity of the measurement target obtained by performing photometry in the measurement target at the first sampling frequency by the photometric unit; a second calculation unit that calculates a flicker amount of a predetermined measurement region set on the measurement target based on a photometric quantity of the predetermined measurement region obtained by performing photometry in the predetermined measurement region at the second sampling frequency by the photometric unit; and a correction unit that corrects the flicker amount of each of the plurality of measurement regions calculated by the first calculation unit using a correction coefficient defined by the flicker amount calculated by the second calculation unit and a flicker amount of the predetermined measurement region calculated based on a photometric quantity of the predetermined measurement region obtained by performing photometry in the predetermined measurement region at the first sampling frequency by the photometric unit.

Any one of the plurality of measurement regions may be set as the predetermined measurement region, or a region other than the plurality of measurement regions may be set as the predetermined measurement region.

The latter flicker amount that defines the correction coefficient (that is, the flicker amount of the predetermined measurement region calculated based on the photometric quantity of the predetermined measurement region obtained by performing photometry in the predetermined measurement region at the first sampling frequency by the photometric unit) may be calculated in advance by the first calculation unit before the first calculation unit calculates the flicker amount of each of the plurality of measurement regions (according to this, the correction coefficient is stored in advance before the measurement of the flicker amount of each of the plurality of measurement regions), or may be calculated by the first calculation unit when the first calculation unit calculates the flicker amount of each of the plurality of measurement regions (according to this, the correction coefficient is calculated in real time when measuring the flicker amount of each of the plurality of measurement regions).

The first calculation unit calculates the flicker amount of each of the plurality of measurement regions set on the measurement target based on a photometric quantity (for example, luminance) of the measurement target obtained by performing photometry in the measurement target at the first sampling frequency (low sampling frequency) by the photometric unit.

The second calculation unit calculates the flicker amount of the predetermined measurement region set on the measurement target based on a photometric quantity (for example, luminance) of the predetermined measurement region obtained by performing photometry in the predetermined measurement region at the second sampling frequency (high sampling frequency) by the photometric unit.

The correction coefficient is defined by the flicker amount of the predetermined measurement region calculated by the second calculation unit and the flicker amount of the predetermined measurement region calculated based on the photometric quantity of the predetermined measurement region obtained by performing photometry in the predetermined measurement region at the first sampling frequency by the photometric unit. In other words, the correction coefficient is defined by the flicker amount calculated using the second sampling frequency (high sampling frequency) and the flicker amount calculated using the first sampling frequency (low sampling frequency) for the predetermined measurement region. The correction unit corrects the flicker amount of each of the plurality of measurement regions calculated by the first calculation unit (the flicker amount of each of the plurality of measurement regions calculated by the first calculation unit using the first sampling frequency) using the correction coefficient. Therefore, it is possible to increase the measurement accuracy of the flicker amount.

As described above, the two-dimensional flicker measurement apparatus according to the first aspect of the embodiment calculates a flicker amount for each of the plurality of measurement regions using the first sampling frequency (low sampling frequency), and corrects the flicker amount using the correction coefficient. Therefore, the flicker amount of each of the plurality of measurement regions set on the measurement target can be measured with high accuracy using a low sampling frequency.

In the configuration described above, a storage unit that stores in advance the correction coefficient calculated before measuring a flicker amount of each of the plurality of measurement regions is further provided, and the correction unit corrects the flicker amount of each of the plurality of measurement regions calculated by the first calculation unit using the correction coefficient stored in the storage unit.

The correction coefficient stored in the storage unit may be calculated using the two-dimensional flicker measurement apparatus before shipping the two-dimensional flicker measurement apparatus from the factory, or may be calculated using the two-dimensional flicker measurement apparatus before the user measures the flicker amount of each of the plurality of measurement regions set on the measurement target using the two-dimensional flicker measurement apparatus.

In the configuration described above, the storage unit stores in advance a plurality of the correction coefficients calculated according to a value of a driving frequency of the measurement target, and the correction unit corrects the flicker amount of each of the plurality of measurement regions calculated by the first calculation unit using the correction coefficient corresponding to the value of the driving frequency of the measurement target among the plurality of correction coefficients stored in the storage unit.

The correction coefficient changes according to the value of the driving frequency of the measurement target (for example, a display screen). Therefore, if the same correction coefficient is used for measurement targets having different driving frequencies, the measurement accuracy of the flicker amount is reduced. According to this configuration, since the correction coefficient is changed according to the value of the driving frequency of the measurement target, such a situation can be prevented.

In the configuration described above, a first input unit is further provided, and the storage unit stores in advance a plurality of the correction coefficients calculated according to a value of the first sampling frequency. When the value of the first sampling frequency is designated using the first input unit, the correction unit corrects the flicker amount of each of the plurality of measurement regions calculated by the first calculation unit using the correction coefficient corresponding to the value designated using the first input unit among the plurality of correction coefficients stored in the storage unit.

This configuration is based on the premise that the two-dimensional flicker measurement apparatus has a function of changing the value of the first sampling frequency. The correction coefficient changes according to the value of the first sampling frequency. Therefore, regardless of the value of the first sampling frequency, if the same correction coefficient is used, the measurement accuracy of the flicker amount is reduced. According to this configuration, since the value of the correction coefficient is changed according to the value of the first sampling frequency, such a situation can be prevented.

In the configuration described above, a second input unit is further provided, and the storage unit stores in advance a plurality of the correction coefficients calculated according to a combination of a value of a driving frequency of the measurement target and a value of the first sampling frequency. When the value of the first sampling frequency is designated using the second input unit, the correction unit corrects the flicker amount of each of the plurality of measurement regions calculated by the first calculation unit using the correction coefficient corresponding to a combination of the value designated using the second input unit and the value of the driving frequency of the measurement target among the plurality of correction coefficients stored in the storage unit.

This configuration is a combination of the above two configurations (The correction coefficient is changed according to the value of the driving frequency of the measurement target. The correction coefficient is changed according to the value of the first sampling frequency). This configuration has the same effect as the above two configurations.

In the configuration described above, the photometric unit includes a two-dimensional imaging device having the first function and the second function, and the second function is a partial reading function.

According to this configuration, the first function and the second function are realized by one two-dimensional imaging device.

In the configuration described above, a light splitting unit that splits light from the measurement target into two light components is further provided. The photometric unit includes a first photometric unit, which is disposed in an optical path of one of the two split light components and has the first function, and a second photometric unit, which is disposed in an optical path of the other one of the two split light components and has the second function. The first calculation unit calculates the flicker amount of each of the plurality of measurement regions based on a photometric quantity of the measurement target obtained by performing photometry in the measurement target by the first photometric unit. The second calculation unit calculates the flicker amount of the predetermined measurement region based on a photometric quantity of the predetermined measurement region obtained by performing photometry in the predetermined measurement region by the second photometric unit. One of the plurality of measurement regions is the predetermined measurement region. The two-dimensional flicker measurement apparatus further includes a third calculation unit that calculates the correction coefficient using the flicker amount of the predetermined measurement region, among the flicker amounts of the plurality of measurement regions calculated by the first calculation unit, and the flicker amount calculated by the second calculation unit. The correction unit corrects the flicker amount of each of the plurality of measurement regions calculated by the first calculation unit using the correction coefficient calculated by the third calculation unit.

In this configuration, a photometric unit (first photometric unit) that performs photometry at the first sampling frequency and a photometric unit (second photometric unit) that performs photometry at the second sampling frequency are separated. The light splitting unit splits the light from the measurement target into two light components, and the first photometric unit is disposed in the optical path of one of the two split light components and the second photometric unit is disposed in the optical path of the other one of the two split light components. Therefore, according to this configuration, when measuring the flicker amount of each of the plurality of measurement regions, it is possible to calculate the correction coefficient in real time. As a result, it is possible to improve the measurement accuracy of the flicker amount of each of the plurality of measurement regions.

In the configuration described above, the first photometric unit includes a first two-dimensional imaging device, and the second photometric unit includes a second two-dimensional imaging device having a partial reading function as the second function or a light receiving element that receives light from a spot region smaller than an imaging region of the first two-dimensional imaging device.

This configuration specifically defines the first photometric unit and the second photometric unit. Since the second photometric unit performs photometry in the predetermined measurement region set on the measurement target, the second photometric unit may not be a two-dimensional imaging device.

In the configuration described above, a third input unit is further provided, the correction unit corrects the flicker amount of each of the plurality of measurement regions calculated by the first calculation unit when an instruction to correct a flicker amount is given using the third input unit before measuring the flicker amount of each of the plurality of measurement regions, and the correction unit does not correct the flicker amount of each of the plurality of measurement regions calculated by the first calculation unit when an instruction to correct no flicker amount is given using the third input unit before measuring the flicker amount of each of the plurality of measurement regions.

Even if the flicker amount of each of the plurality of measurement regions calculated by the first calculation unit is not corrected by the correction coefficient, the relative value of the flicker amount of each of the plurality of measurement regions can be known. If it is sufficient to use the relative value of the flicker amount of each of the plurality of measurement regions, the measurer gives an instruction to correct no flicker amount using the third input unit.

A two-dimensional flicker measurement method according to a second aspect of the embodiment is a two-dimensional flicker measurement method for measuring a flicker amount of each of a plurality of measurement regions set on a measurement target using a photometric unit having a first function of performing photometry in a two-dimensional region at a first sampling frequency and a second function of performing photometry in a region smaller than the two-dimensional region at a second sampling frequency higher than the first sampling frequency, and includes: a first calculation step of calculating the flicker amount of each of the plurality of measurement regions set on the measurement target based on a photometric quantity of the measurement target obtained by performing photometry in the measurement target at the first sampling frequency by the photometric unit; a second calculation step of calculating a flicker amount of a predetermined measurement region set on the measurement target based on a photometric quantity of the predetermined measurement region obtained by performing photometry in the predetermined measurement region at the second sampling frequency by the photometric unit; and a correction step of correcting the flicker amount of each of the plurality of measurement regions calculated in the first calculation step using a correction coefficient defined by the flicker amount calculated in the second calculation step and a flicker amount of the predetermined measurement region calculated based on a photometric quantity of the predetermined measurement region obtained by performing photometry in the predetermined measurement region at the first sampling frequency by the photometric unit.

The two-dimensional flicker measurement method according to the second aspect of the embodiment defines the two-dimensional flicker measurement apparatus according to the first aspect of the embodiment from the viewpoint of a method, and has the same operation and effect as the two-dimensional flicker measurement apparatus according to the first aspect of the embodiment.

While the embodiment of the present invention has been illustrated and described in detail, this is merely an illustration and an example and the present invention is not limited thereto. The scope of the present invention should be interpreted in accordance with the appended claims.

The entire disclosure of Japanese Patent Application No. 2017-195103 filed on Oct. 5, 2017 is incorporated herein by reference in its entirety.

INDUSTRIAL APPLICABILITY

According to the present invention, it is possible to provide a two-dimensional flicker measurement apparatus and a two-dimensional flicker measurement method.

The invention claimed is:

1. A two-dimensional flicker measurement apparatus, comprising:
a photometer that has a first function of performing photometry in a two-dimensional region at a first sampling frequency and a second function of performing photometry in a region smaller than the two-dimensional region at a second sampling frequency higher than the first sampling frequency; and
a hardware processor that calculates a flicker amount of each of a plurality of measurement regions, which are set on a measurement target and are included in the two-dimensional region, based on a photometric quantity of the measurement target obtained by performing photometry in the measurement target at the first sampling frequency by the photometer,
wherein the hardware processor calculates a flicker amount of a predetermined measurement region, which is set on the measurement target, corresponds to the region smaller than the two-dimensional region and is one of the plurality of measurement regions or is provided separately from the plurality of measurement regions, based on a photometric quantity of the predetermined measurement region obtained by performing photometry in the predetermined measurement region at the second sampling frequency by the photometer, and
the hardware processor corrects the flicker amount of each of the plurality of measurement regions calculated by the hardware processor using a correction coefficient defined by the flicker amount of the predetermined measurement region calculated by the hardware processor based on the photometric quantity of the predetermined measurement region obtained by performing photometry in the predetermined measurement region at the second sampling frequency by the photometer and a flicker amount of the predetermined measurement region calculated based on a photometric quantity of the predetermined measurement region obtained by performing photometry in the predetermined measurement region at the first sampling frequency by the photometer.

2. The two-dimensional flicker measurement apparatus according to claim 1,
wherein the hardware processor stores in advance the correction coefficient calculated before measuring a flicker amount of each of the plurality of measurement regions, and
the hardware processor corrects the flicker amount of each of the plurality of measurement regions calculated by the hardware processor using the correction coefficient stored in the hardware processor.

3. The two-dimensional flicker measurement apparatus according to claim 2,
wherein the hardware processor stores in advance a plurality of the correction coefficients calculated according to a value of a driving frequency of the measurement target, and
the hardware processor corrects the flicker amount of each of the plurality of measurement regions calculated by the hardware processor using the correction coefficient corresponding to the value of the driving frequency of the measurement target among the plurality of correction coefficients stored in the hardware processor.

4. The two-dimensional flicker measurement apparatus according to claim 3, wherein the photometer includes a two-dimensional imager having the first function and the second function, and the second function is a partial reading function.

5. The two-dimensional flicker measurement apparatus according to claim 3, further comprising:

a third inputter, wherein the hardware processor corrects the flicker amount of each of the plurality of measurement regions calculated by the hardware processor when an instruction to correct a flicker amount is given using the third inputter before measuring the flicker amount of each of the plurality of measurement regions, and the hardware processor does not correct the flicker amount of each of the plurality of measurement regions calculated by the hardware processor when an instruction to correct no flicker amount is given using the third inputter before measuring the flicker amount of each of the plurality of measurement regions.

6. The two-dimensional flicker measurement apparatus according to claim 2, further comprising:

a first inputter, wherein the hardware processor stores in advance a plurality of the correction coefficients calculated according to a value of the first sampling frequency, and when the value of the first sampling frequency is designated using the first inputter, the hardware processor corrects the flicker amount of each of the plurality of measurement regions calculated by the hardware processor using the correction coefficient corresponding to the value designated using the first inputter among the plurality of correction coefficients stored in the hardware processor.

7. The two-dimensional flicker measurement apparatus according to claim 6, wherein the photometer includes a two-dimensional imager having the first function and the second function, and the second function is a partial reading function.

8. The two-dimensional flicker measurement apparatus according to claim 6, further comprising:

a third inputter, wherein the hardware processor corrects the flicker amount of each of the plurality of measurement regions calculated by the hardware processor when an instruction to correct a flicker amount is given using the third inputter before measuring the flicker amount of each of the plurality of measurement regions, and the hardware processor does not correct the flicker amount of each of the plurality of measurement regions calculated by the hardware processor when an instruction to correct no flicker amount is given using the third inputter before measuring the flicker amount of each of the plurality of measurement regions.

9. The two-dimensional flicker measurement apparatus according to claim 2, further comprising:

a second inputter, wherein the hardware processor stores in advance a plurality of the correction coefficients calculated according to a combination of a value of a driving frequency of the measurement target and a value of the first sampling frequency, and when the value of the first sampling frequency is designated using the second inputter, the hardware processor corrects the flicker amount of each of the plurality of measurement regions calculated by the hardware processor using the correction coefficient corresponding to a combination of the value designated using the second inputter and the value of the driving frequency of the measurement target among the plurality of correction coefficients stored in the hardware processor.

10. The two-dimensional flicker measurement apparatus according to claim 9, wherein the photometer includes a two-dimensional imager having the first function and the second function, and the second function is a partial reading function.

11. The two-dimensional flicker measurement apparatus according to claim 9, further comprising:

a third inputter, wherein the hardware processor corrects the flicker amount of each of the plurality of measurement regions calculated by the hardware processor when an instruction to correct a flicker amount is given using the third inputter before measuring the flicker amount of each of the plurality of measurement regions, and the hardware processor does not correct the flicker amount of each of the plurality of measurement regions calculated by the hardware processor when an instruction to correct no flicker amount is given using the third inputter before measuring the flicker amount of each of the plurality of measurement regions.

12. The two-dimensional flicker measurement apparatus according to claim 2, wherein the photometer includes a two-dimensional imager having the first function and the second function, and the second function is a partial reading function.

13. The two-dimensional flicker measurement apparatus according to claim 2, further comprising:

a third inputter, wherein the hardware processor corrects the flicker amount of each of the plurality of measurement regions calculated by the hardware processor when an instruction to correct a flicker amount is given using the third inputter before measuring the flicker amount of each of the plurality of measurement regions, and the hardware processor does not correct the flicker amount of each of the plurality of measurement regions calculated by the hardware processor when an instruction to correct no flicker amount is given using the third inputter before measuring the flicker amount of each of the plurality of measurement regions.

14. The two-dimensional flicker measurement apparatus according to claim 1, wherein the photometer includes a two-dimensional imager having the first function and the second function, and the second function is a partial reading function.

15. The two-dimensional flicker measurement apparatus according to claim 14, further comprising:

a third inputter, wherein the hardware processor corrects the flicker amount of each of the plurality of measurement regions calculated by the hardware processor when an instruction to correct a flicker amount is given using the third inputter before measuring the flicker amount of each of the plurality of measurement regions, and the hardware processor does not correct the flicker amount of each of the plurality of measurement regions calculated by the hardware processor when an instruction to correct no flicker amount is given using the third inputter before measuring the flicker amount of each of the plurality of measurement regions.

16. The two-dimensional flicker measurement apparatus according to claim 1, further comprising:
   a light splitter that splits light from the measurement target into two light components,
   wherein the photometer includes a first photometer, which is disposed in an optical path of one of the two split light components and has the first function, and a second photometer, which is disposed in an optical path of the other one of the two split light components and has the second function,
   the hardware processor calculates the flicker amount of each of the plurality of measurement regions based on a photometric quantity of the measurement target obtained by performing photometry in the measurement target by the first photometer,
   the hardware processor calculates the flicker amount of the predetermined measurement region based on a photometric quantity of the predetermined measurement region obtained by performing photometry in the predetermined measurement region by the second photometer,
   one of the plurality of measurement regions is the predetermined measurement region,
   the hardware processor calculates the correction coefficient using the flicker amount of the predetermined measurement region, among the flicker amounts of the plurality of measurement regions calculated by the hardware processor, and the flicker amount calculated by the hardware processor, and
   the hardware processor corrects the flicker amount of each of the plurality of measurement regions calculated by the hardware processor using the correction coefficient calculated by the hardware processor.

17. The two-dimensional flicker measurement apparatus according to claim 16,
   wherein the first photometer includes a first two-dimensional imager, and
   the second photometer includes a second two-dimensional imager having a partial reading function as the second function or a light receiving element that receives light from a spot region smaller than an imaging region of the first two-dimensional imager.

18. The two-dimensional flicker measurement apparatus according to claim 16, further comprising:
   a third inputter,
   wherein the hardware processor corrects the flicker amount of each of the plurality of measurement regions calculated by the hardware processor when an instruction to correct a flicker amount is given using the third inputter before measuring the flicker amount of each of the plurality of measurement regions, and the hardware processor does not correct the flicker amount of each of the plurality of measurement regions calculated by the hardware processor when an instruction to correct no flicker amount is given using the third inputter before measuring the flicker amount of each of the plurality of measurement regions.

19. The two-dimensional flicker measurement apparatus according to claim 1, further comprising:
   a third inputter,
   wherein the hardware processor corrects the flicker amount of each of the plurality of measurement regions calculated by the hardware processor when an instruction to correct a flicker amount is given using the third inputter before measuring the flicker amount of each of the plurality of measurement regions, and the hardware processor does not correct the flicker amount of each of the plurality of measurement regions calculated by the hardware processor when an instruction to correct no flicker amount is given using the third inputter before measuring the flicker amount of each of the plurality of measurement regions.

20. A two-dimensional flicker measurement method for measuring a flicker amount of each of a plurality of measurement regions set on a measurement target using a photometer having a first function of performing photometry in a two-dimensional region at a first sampling frequency and a second function of performing photometry in a region smaller than the two-dimensional region at a second sampling frequency higher than the first sampling frequency, the method comprising:
   calculating the flicker amount of each of the plurality of measurement regions, which are set on the measurement target and are included in the two-dimensional region, based on a photometric quantity of the measurement target obtained by performing photometry in the measurement target at the first sampling frequency by the photometer;
   calculating a flicker amount of a predetermined measurement region, which is set on the measurement target, corresponds to the region smaller than the two-dimensional region and is one of the plurality of measurement regions or is provided separately from the plurality of measurement regions, based on a photometric quantity of the predetermined measurement region obtained by performing photometry in the predetermined measurement region at the second sampling frequency by the photometer; and
   correcting the flicker amount of each of the plurality of measurement regions calculated in the calculating the flicker amount of each of the plurality of measurement regions using a correction coefficient defined by the flicker amount of the predetermined measurement region calculated based on the photometric quantity of the predetermined measurement region obtained by performing photometry in the predetermined measurement region at the second sampling frequency by the photometer and a flicker amount of the predetermined measurement region calculated based on a photometric quantity of the predetermined measurement region obtained by performing photometry in the predetermined measurement region at the first sampling frequency by the photometer.

* * * * *